United States Patent
Yan et al.

(10) Patent No.: US 11,516,447 B2
(45) Date of Patent: Nov. 29, 2022

(54) INTEGRATED IMAGING DISPLAY SYSTEM

(71) Applicant: Army Academy of Armored forces of PLA, Beijing (CN)

(72) Inventors: Xingpeng Yan, Beijing (CN); Xiaoyu Jiang, Beijing (CN); Weifeng Wang, Beijing (CN); Yan Mao, Beijing (CN); Xi Wang, Beijing (CN); Yunpeng Liu, Beijing (CN); Qiang Qu, Beijing (CN)

(73) Assignee: Army Academy of Armored forces of PLA, Beijing (CN)

( * ) Notice: Subject to any disclaimer, the term of this patent is extended or adjusted under 35 U.S.C. 154(b) by 0 days.

(21) Appl. No.: 17/446,733

(22) Filed: Sep. 2, 2021

(65) Prior Publication Data

US 2022/0070418 A1    Mar. 3, 2022

(30) Foreign Application Priority Data

Sep. 2, 2020    (CN) .......................... 202010909485.1

(51) Int. Cl.
*H04N 9/31* (2006.01)
*G03B 21/20* (2006.01)

(52) U.S. Cl.
CPC ........... *H04N 9/317* (2013.01); *G03B 21/208* (2013.01); *H04N 9/3152* (2013.01)

(58) Field of Classification Search
None
See application file for complete search history.

(56) References Cited

U.S. PATENT DOCUMENTS

| 5,398,125 | A | * | 3/1995 | Willett | .............. | G02F 1/133526 |
| | | | | | | 349/5 |
| 2016/0091784 | A1 | * | 3/2016 | Hu | ..................... | G02B 27/0994 |
| | | | | | | 353/102 |

* cited by examiner

*Primary Examiner* — Bao-Luan Q Le
*Assistant Examiner* — Danell L Owens
(74) *Attorney, Agent, or Firm* — DLA Piper LLP (US)

(57) ABSTRACT

An integrated imaging display system is provided. The integrated imaging display system includes: a light source, a converging lens, an illumination microlens array, and a projection microlens array, where illumination microlens units in the illumination microlens array and projection microlens units in the projection microlens array are disposed in a one-to-one correspondence, and the converging lens converts all light emitted by the light source into parallel light and then irradiates the parallel light to the illumination microlens array; a sub-image is provided on a side of each of the illumination microlens units close to the projection microlens unit; all light emitted by each of the illumination microlens units is irradiated on a corresponding projection microlens unit after passing through the sub-image, and the projection microlens array displays an image of the sub-image.

9 Claims, 3 Drawing Sheets

INTEGRATED IMAGING DISPLAY SYSTEM

CROSS REFERENCE TO RELATED APPLICATION

This application claims priority to Chinese Patent Application No. 202010909485.1, filed Sep. 2, 2020, the content of which is incorporated herein by reference in its entirety.

TECHNICAL FIELD

The present disclosure relates to the technical field of integrated imaging display systems, and in particular, to an integrated imaging display system.

BACKGROUND ART

It is very important to provide suitable illumination for most optical systems. In existing integrated imaging systems, when light passing through an illumination microlens is irradiated on a corresponding projection microlens, it is also irradiated on an adjacent lens of the corresponding projection microlens, so that an artifact is formed on the projection microlens to destroy an image itself and contrast and resolution of the image are reduced, which seriously affect imaging effect of the optical systems. Therefore, making light pass through the illumination microlens irradiated only on the corresponding projection microlens is an issue that needs to be urgently resolved by a person skilled in the art, so as to avoid the artifact and further improve the imaging effect.

SUMMARY

The present disclosure intends to provide an integrated imaging display system to avoid an artifact.

To achieve the above effect, the present disclosure provides the following solutions.

An integrated imaging display system is provided, including a light source, a converging lens, an illumination microlens array, a sub-image to be imaged, and a projection microlens array, where the converging lens is located on an emission light path of the light source; the illumination microlens array is located on an output light path of the converging lens; the sub-image is located on an output light path of the illumination microlens array; the projection microlens array is located on an output light path of the sub-image; and the projection microlens array is configured to display an image of the sub-image. The light source includes a plurality of point light sources; the illumination microlens array includes a plurality of illumination microlens units; the projection microlens array includes a plurality of projection microlens units; the number of the illumination microlens units is equal to the number of the projection microlens units; and the illumination microlens units and the projection microlens units are disposed in a one-to-one correspondence; and each of the point light sources is located at a focal plane of the converging lens, the converging lens is configured to convert all light emitted by the point light sources into parallel light and then irradiate the parallel light to the illumination microlens array, and all light emitted by each of the illumination microlens units is irradiated on a corresponding projection microlens unit after passing through the sub-image.

In an embodiment, the converging lens specifically includes: a concave lens and a convex lens, where a plane side of the concave lens is matched with the light source; a concave side of the concave lens is matched with a first convex side of the convex lens; and a second convex side of the convex lens is matched with the illumination microlens array.

In an embodiment, a distance between the light source and the converging lens is equal to a focal length of the converging lens.

In an embodiment, a diameter of the illumination microlens unit, a diameter of the projection microlens unit, and a diameter of the sub-image are all equal.

In an embodiment, a distance between the illumination microlens array and the projection microlens array is equal to a sum of a focal length of the illumination microlens unit and a focal length of the projection microlens unit.

In an embodiment, a diameter of the light source, the distance between the illumination microlens array and the projection microlens array, the focal length of the converging lens, and the diameter of the projection microlens unit meet the following formula:

$$\phi_s = P_R \frac{f_{CL}}{f_{PL}},$$

where, $\Phi_s$ is the diameter of the light source, $P_R$ is the diameter of the projection microlens unit, $f_{CL}$ is the focal length of the converging lens, and $f_{PL}$ is the distance between the illumination microlens array and the projection microlens array.

In an embodiment, the focal length of the converging lens is 90 mm.

In an embodiment, the diameter of the illumination microlens unit, the diameter of the projection microlens unit, and the diameter of the sub-image are all 28 mm.

Compared with the conventional art, beneficial effects of the present disclosure are as follows. The present disclosure provides the integrated imaging display system. In the integrated imaging display system, a converging lens disposed between a light source and an illumination microlens array to convert all light emitted by the light source into parallel light and then irradiates the parallel light to the illumination microlens array, and all the light emitted by each of the illumination microlens units in the illumination microlens array is irradiated on the corresponding projection microlens unit after passing through the sub-image. It avoids a phenomenon that in an existing integrated imaging display system, the light emitted by one illumination microlens unit is irradiated on a plurality of projection microlens units in the projection microlens array to form the artifact, thereby improving an imaging effect of the integrated imaging display system.

BRIEF DESCRIPTION OF THE DRAWINGS

In order to more clearly illustrate the embodiments of the present disclosure or technical solutions in the related art, the accompanying drawings used in the embodiments will now be described briefly. Apparently, the accompanying drawings in the following description are only some embodiments of the present disclosure, and those skilled in the art can obtain other drawings from these drawings without any creative efforts.

Figure 1:
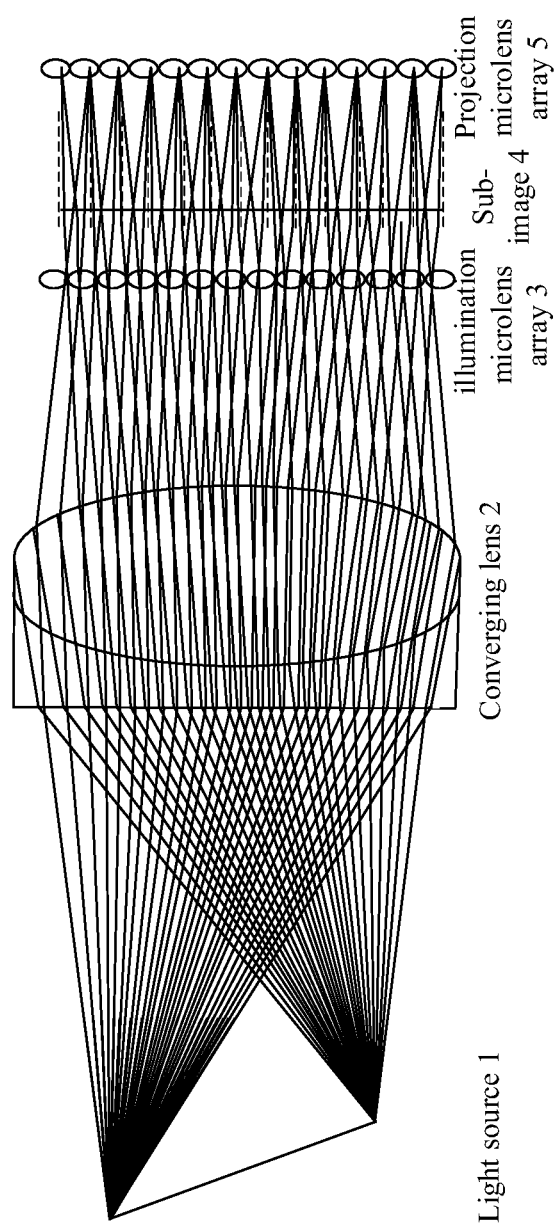
FIG. 1 is a schematic structural diagram of an integrated imaging display system according to an embodiment of the present disclosure.

Reference numerals: 1, light source; 2, converging lens; 3, illumination microlens array; 4, sub-image; and 5, projection microlens array.

DETAILED DESCRIPTION OF THE EMBODIMENTS

In the following, the technical solutions in embodiments of the present disclosure will be clearly and completely described with reference to the accompanying drawings in the embodiments of the present disclosure. Obviously, the described embodiments are merely a part of the embodiments of the present disclosure rather than all of the embodiments thereof. Based on the embodiments of the present disclosure, all other embodiments obtained by those skilled in the art without any creative efforts shall fall within the scope of the present disclosure.

The present disclosure intends to provide an integrated imaging display system to avoid an artifact.

For a better understanding of above intention, features, and advantages of the present disclosure, the present disclosure will be described in details below with reference to the accompanying drawings and specific embodiments thereof.

FIG. 1 is a schematic structural diagram of an integrated imaging display system according to an embodiment of the present disclosure. As shown in FIG. 1, the integrated imaging display system provided in the present disclosure includes a light source 1, a converging lens 2, an illumination microlens array 3, a sub-image 4 to be imaged, and a projection microlens array 5.

The converging lens 2 is located on an emission light path of the light source 1, the illumination microlens array 3 is located on an output light path of the converging lens 2, the sub-image 4 is located on an output light path of the illumination microlens array 3, the projection microlens array 5 is located on an output light path of the sub-image 4, and the projection microlens array 5 is configured to display an image of the sub-image.

The light source 1 includes a plurality of point light sources, the illumination microlens array 3 includes a plurality of illumination microlens units, the projection microlens array 5 includes a plurality of projection microlens units, the number of the illumination microlens units is equal to the number of projection microlens units, and the illumination microlens units and the projection microlens units are disposed in a one-to-one correspondence; and each of the point light sources is located at a focal plane of the converging lens 2, the converging lens 2 is configured to convert all light emitted by the point light sources into parallel light and then irradiate the parallel light to the illumination microlens array 3, the sub-image 4 is provided on a side of each of the illumination microlens units close to the projection microlens unit, and all light emitted by each of the illumination microlens units is irradiated on a corresponding projection microlens unit after passing through the sub-image 4.

The converging lens 2 specifically includes a concave lens and a convex lens, where a plane side of the concave lens is matched with the light source 1; a concave side of the concave lens is matched with a first convex side of the convex lens; a second convex side of the convex lens is matched with the illumination microlens array 3; a distance between the concave lens and the light source 1 is less than a distance between the convex lens and the light source 1; a distance between the plane side of the concave lens and the light source 1 is less than a distance between the concave side of the concave lens and the light source 1; the concave side of the concave lens is matched with the first convex side of the convex lens; and a distance between the first convex side of the convex lens and the illumination microlens array 3 is greater than a distance between the second convex side of the convex lens and the illumination microlens array 3.

A distance between the light source 1 and the converging lens 2 is equal to a focal length of the converging lens 2, and a diameter of the illumination microlens unit, a diameter of the projection microlens unit, and a diameter of the sub-image 4 are all equal. A distance between the illumination microlens array 3 and the projection microlens array 5 is equal to a sum of a focal length of the illumination microlens unit and a focal length of the projection microlens unit.

Specifically, the focal length of the converging lens 2 is 90 mm, and the diameter of the illumination microlens unit, the diameter of the projection microlens unit, and the diameter of the sub-image 4 are all 28 mm.

In addition, a diameter of the light source 1, the distance between the illumination microlens array 3 and the projection microlens array 5, the focal length of the converging lens 2, and the diameter of the projection microlens unit meet the following formula:

$$\phi_s = P_R \frac{f_{CL}}{f_{PL}},$$

where, $\Phi_s$ is the diameter of the light source 1, $P_R$ is the diameter of the projection microlens unit, $f_{CL}$ is the focal length of the converging lens 2, and $f_{PL}$ is the distance between the illumination microlens array 3 and the projection microlens array 5.

In the integrated imaging display system provided by the present disclosure, a group of parallel light is formed under action of the illumination microlens array 3 and the converging lens 2 and evenly illuminates the sub-image 4, so that an observed image has higher contrast. In addition, in the integrated imaging display system provided in the present disclosure, an optical illuminance blocking principle is applied to the integrated imaging system, thereby avoiding a formation of the artifact.

Figure 2:
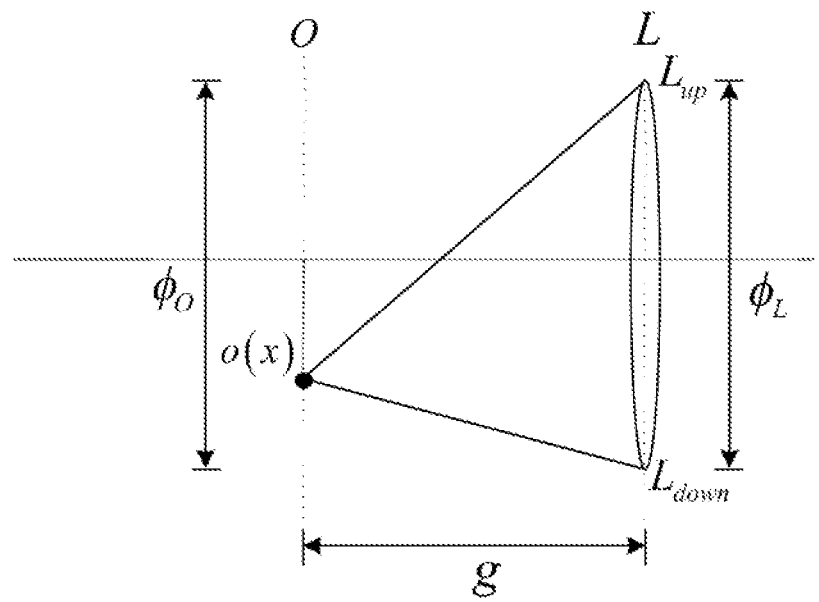
FIG. 2 is a first principal diagram of forming a light barrier according to an embodiment of the present disclosure.

Specifically, as shown in FIGS. 2-5, FIG. 2 is a first principal diagram of forming a light barrier according to an embodiment of the present disclosure. In FIG. 2, o(x) represents any point on an illumination microlens, L represents a projection microlens, O represents the illumination microlens, $\Phi L$ represents a diameter of the projection microlens, $\Phi O$ represents a diameter of the illumination microlens, g represents a distance between the illumination microlens and the projection microlens, and $L_{up}$ and $L_{down}$ respectively represent two end points of a diameter on the projection microlens. As shown in FIG. 2, in the integrated imaging system, in order to make the image of the sub-image fall on a corresponding projection microlens, a range of a light cone emitted after some light passes through the point o(x) on the illumination microlens is limited by the diameter of the projection microlens. It can be learned that a realizable optical illumination barrier needs to simultaneously meet the following three basic conditions: (1) a size of an illumination field needs to be equal to a size of the sub-image; (2) a diameter of light on a plane of an axicon needs to match a diameter of a microlens, and the microlens refers to the illumination microlens and the projection microlens; and (3) a central line cone needs to point to a center of a corresponding microlens.

The size of the illumination field is the diameter of the light source; the size of the sub-image (not shown in FIG. 2) is equal to the diameter of the illumination microlens; the diameter of the light on the plane of the axicon is a diameter of a cone formed when all light emitted by the light source enters a point of the illumination microlens, that is, the diameter of the light source; and the central line cone includes a right cone formed when all the light emitted by the light source enters a point of the illumination microlens, and a right cone formed by light emitted from the point on the illumination microlens and the projection microlens.

Figure 3:
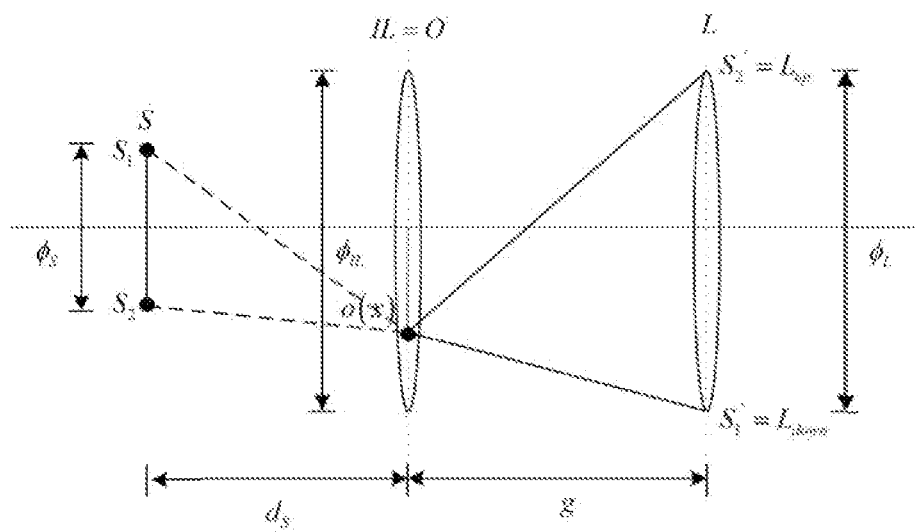
FIG. 3 is a second principal diagram of forming the light barrier according to an embodiment of the present disclosure.

FIG. 3 is a second principal diagram of forming the light barrier according to an embodiment of the present disclosure. In FIG. 3, IL represents the illumination microlens, L represents the projection microlens, o(x) represents any point on the illumination microlens, O represents the illumination microlens, $\Phi_L$ represents the diameter of the projection microlens, $\Phi$IL represents the diameter of the illumination microlens, S represents the light source, $\Phi_S$ represents the diameter of the light source, and $S_1$ and $S_2$ respectively represent two end points of a diameter on the light source; and $S_1'$ represents a corresponding point on the projection microlens after light emitted by the point $S_1$ on the light source passes through the point o(x) on the illumination microlens, $S_1'$ is $L_{down}$ in FIG. 2, $S_2$ represents a corresponding point on the projection microlens after light emitted by the point $S_2$ on the light source passes through the point o(x) on the illumination microlens, $S_2'$ is $L_{up}$ in FIG. 2, g represents the distance between the illumination microlens and the projection microlens, and $d_s$ represents a distance between the light source and the illumination microlens. In addition, the diameter $\Phi^{IL}$ of the sub-image (not shown in FIG. 3) is equal to the diameter $\Phi$IL of the illumination microlens.

As shown in FIG. 3, to implement the optical illumination barrier, the following conditions need to be met. First, it needs to be ensured that the diameter of the projection microlens is equal to the size of the sub-image, and the size of the sub-image (not shown in FIG. 3) is equal to the diameter of the illumination microlens. That is, a formula: $\Phi_L=\Phi_{IL}$ is established, and in this case, the condition (1) is established. Second, the diameter of the light source is matched with the diameter of the projection microlens. That is, a formula:

$$\phi_S = \frac{d_S}{g}\phi_L$$

is established. The point $S_1$ on a plane of the light source in FIG. 3 is imaged to the point $S_1'$ that overlaps $L_{down}$ in FIG. 2, and meanwhile, the point $S_2$ on the light source S is imaged to the point $S_2'$ that overlaps $L_{up}$ in FIG. 2. Therefore, it is easy to verify that rays $S_1O(x)S_1'$ provide upper and lower limits of a ray cone. Therefore, a diameter of the cone formed by light emitted from a point on the illumination microlens needs to be equal to the diameter of the microlens to meet the condition (2). Third, because all the light in FIG. 3 is emitted from a lens aperture of o(x), the central line cone passes through a center of the microlens, and in this case, the condition (3) is established. Therefore, making the light source S consistent with the projection microlens L directly ensures that the condition (2) and the condition (3) are simultaneously established.

Figure 4:
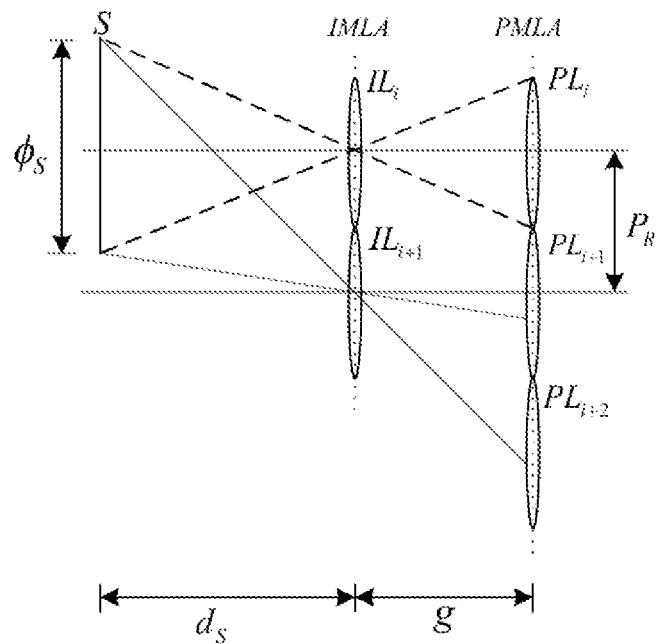
FIG. 4 is a principal diagram of forming an artifact according to an embodiment of the present disclosure.
Figure 5:
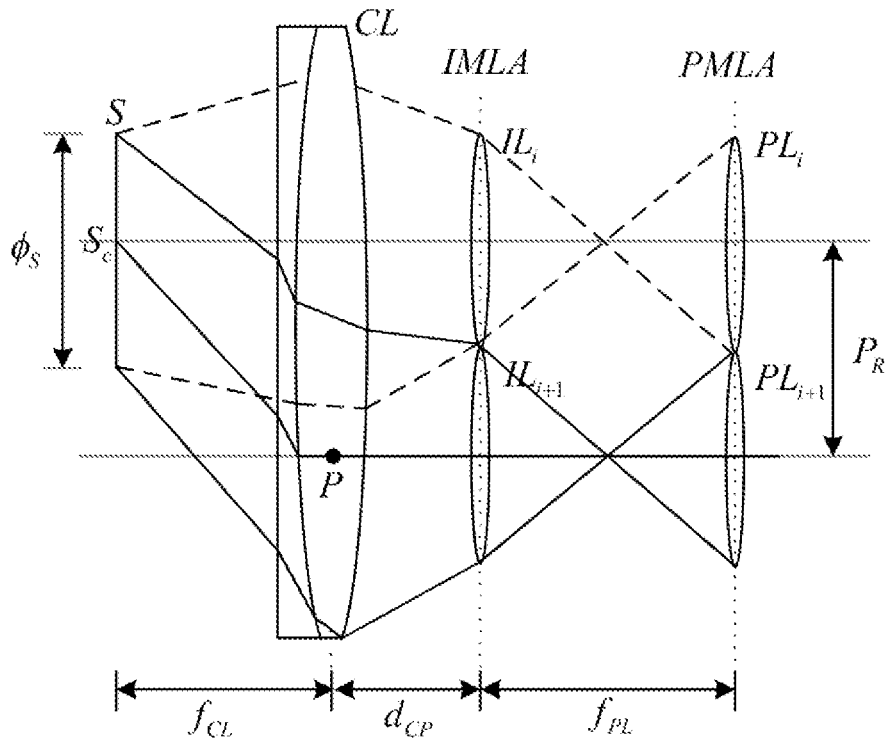
FIG. 5 is a principal diagram of avoiding an artifact according to an embodiment of the present disclosure.

FIG. 4 is a principal diagram of forming the artifact according to an embodiment of the present disclosure. FIG. 5 is a principal diagram of avoiding the artifact according to an embodiment of the present disclosure. In FIG. 4 and FIG. 5, S represents the light source, $\Phi_S$ represents the diameter of the light source S, IMLA represents the illumination microlens array, PLMA represents the projection microlens array, $IL_i$ represents the $i^{th}$ illumination microlens, $IL_{i+1}$ represents the $(i+1)^{th}$ illumination microlens, $PL_i$ represents the $i^{th}$ projection microlens, $PL_{i+1}$ represents the $(i+1)^{th}$ projection microlens, and $P_R$ represents a distance between optical centers of two adjacent projection microlenses (that is, the diameter of the projection microlens). In addition, in FIG. 4, g represents the distance between the illumination microlens and the projection microlens, and $d_s$ represents the distance between the light source and the illumination microlens. In FIG. 5, CL represents the converging lens, $f_{CL}$ is the focal length of the converging lens, $d_{CP}$ represents a distance between the converging lens and the illumination microlens, $f_{PL}$ is the distance between the illumination microlens array and the projection microlens array, $S_C$ represents a center of the light source S, and P represents a point on the converging lens corresponding to an optical center of the $(i+1)^{th}$ illumination microlens $IL_{i+1}$.

As shown in FIG. 4, the center of the light source, an optical center of the $i^{th}$ illumination microlens $IL_i$, and an optical center of the $i^{th}$ projection microlens $PL_i$ are arranged in a straight line. In this case, all the light emitted by the light source S is irradiated to the $i^{th}$ projection microlens $PL_i$ after passing through the optical center of the $i^{th}$ illumination microlens $IL_i$. However, a part of light formed after the light emitted by the light source S passes through the optical center of the $(i+1)^{th}$ illumination microlens $IL_{i+1}$ enters the $(i+1)^{th}$ projection microlens $PL_{i+1}$ and a part of the light enters the $(i+2)^{th}$ projection microlens $PL_{i+2}$. During capture stage, when a diameter of a microimage of the sub-image (that is, a diameter of a circle formed by all light emitted from a point on the illumination microlens on a plane where the projection microlens is located) exceeds a distance between centers of two adjacent microlenses in the projection microlens array, images formed by adjacent sub-images on the projection microlens array overlap, resulting in flipped images or artifacts. The reason is that light from a specific microimage passes through a plurality of projection microlenses, generating a plurality of reconstruction paths.

To make the integrated imaging display system have only one reconstruction point, as shown in FIG. 5, the converging lens CL is disposed between the light source S and the illumination microlens array ILMA, and the light source is located at the focal plane of the converging lens CL. To make the diameter of the microimage of the sub-image equal to the distance $P_R$ between the optical centers of the two adjacent projection microlenses in the projection microlens array, the following equation needs to be met:

$$\phi_S = P_R \frac{f_{CL}}{f_{PL}}.$$

The light emitted from the center $S_C$ of the light source S is refracted by the point P on the converging lens CL, and then enters an optical center of the $(i+1)^{th}$ projection microlens $PL_{i+1}$ after passing through the optical center of the $(i+1)^{th}$ illumination microlens $IL_{i+1}$, thereby ensuring that light emitted by any illumination microlens in the integrated imaging display system is irradiated on the corresponding projection microlens.

Various embodiments in this description have been described in a progressive manner, each of which emphasizes differences from the others, and among which the same and similar parts can be referred to each other.

The principle and implementations of the present disclosure have been described herein with specific examples, and the above embodiments are described for a better understanding of the methods and the core concepts of the present disclosure. In addition, the detailed implementation and the application scope could be amended by those skilled in the art according to the teachings of the present disclosure. In conclusion, the contents of this specification shall not be construed as a limitation to the present disclosure.

What is claimed is:

1. An integrated imaging display system, wherein the integrated imaging display system comprises:
    a light source;
    a converging lens;
    an illumination microlens array;
    a sub-image to be imaged;
    and a projection microlens array;
    wherein, the converging lens is located on an emission light path of the light source, the illumination microlens array is located on an output light path of the converging lens, the sub-image is located on an output light path of the illumination microlens array, the projection microlens array is located on an output light path of the sub-image, and the projection microlens array is configured to display an image of the sub-image;
    wherein the light source comprises a plurality of point light sources, the illumination microlens array comprises a plurality of illumination microlens units, the projection microlens array comprises a plurality of projection microlens units, a number of the illumination microlens units is equal to a number of the projection microlens units, and the illumination microlens units and the projection microlens units are disposed in a one-to-one correspondence; and
    each of the point light sources is located at a focal plane of the converging lens, the converging lens is configured to convert all light emitted by the point light sources into parallel light and then irradiate the parallel light to the illumination microlens array, and all light emitted by each of the illumination microlens units is irradiated on a corresponding projection microlens unit after passing through the sub-image;
    wherein a diameter of the illumination microlens unit, a diameter of the projection microlens unit, and a diameter of the sub-image are all equal.

2. The integrated imaging display system according to claim 1, wherein the converging lens comprises:
    a concave lens; and
    a convex lens,
    wherein:
        a plane side of the concave lens is matched with the light source;
        a concave side of the concave lens is matched with a first convex side of the convex lens; and
        a second convex side of the convex lens is matched with the illumination microlens array.

3. The integrated imaging display system according to claim 1, wherein a distance between the light source and the converging lens is equal to a focal length of the converging lens.

4. The integrated imaging display system according to claim 1, wherein a distance between the illumination microlens array and the projection microlens array is equal to a sum of a focal length of the illumination microlens unit and a focal length of the projection microlens unit.

5. The integrated imaging display system according to claim 1, wherein a diameter of the light source, a distance between the illumination microlens array and the projection microlens array, a focal length of the converging lens, and a diameter of the projection microlens unit meet a following formula:

$$\phi_s = P_R \frac{f_{CL}}{f_{PL}},$$

wherein, $\Phi_s$ is the diameter of the light source, $P_R$R is the diameter of the projection microlens unit, $f_{CL}$ is the focal length of the converging lens, and $f_{PL}$ is the distance between the illumination microlens array and the projection microlens array.

6. The integrated imaging display system according to claim 1, wherein a focal length of the converging lens is 90 mm.

7. The integrated imaging display system according to claim 1, wherein a diameter of the illumination microlens unit, a diameter of the projection microlens unit, and a diameter of the sub-image are all 28 mm.

8. An integrated imaging display system, wherein the integrated imaging display system comprises:
    a light source;
    a converging lens;
    an illumination microlens array;
    a sub-image to be imaged;
    and a projection microlens array;
    wherein, the converging lens is located on an emission light path of the light source, the illumination microlens array is located on an output light path of the converging lens, the sub-image is located on an output light path of the illumination microlens array, the projection microlens array is located on an output light path of the sub-image, and the projection microlens array is configured to display an image of the sub-image;
    wherein the light source comprises a plurality of point light sources, the illumination microlens array comprises a plurality of illumination microlens units, the projection microlens array comprises a plurality of projection microlens units, a number of the illumination microlens units is equal to a number of the projection microlens units, and the illumination microlens units and the projection microlens units are disposed in a one-to-one correspondence; and
    each of the point light sources is located at a focal plane of the converging lens, the converging lens is configured to convert all light emitted by the point light sources into parallel light and then irradiate the parallel light to the illumination microlens array, and all light emitted by each of the illumination microlens units is irradiated on a corresponding projection microlens unit after passing through the sub-image;

wherein the converging lens comprises:
a concave lens; and
a convex lens,
wherein:
- a plane side of the concave lens is matched with the light source;
- a concave side of the concave lens is matched with a first convex side of the convex lens; and
- a second convex side of the convex lens is matched with the illumination microlens array.

9. An integrated imaging display system, wherein the integrated imaging display system comprises:
a light source;
a converging lens;
an illumination microlens array;
a sub-image to be imaged;
and a projection microlens array;
wherein, the converging lens is located on an emission light path of the light source, the illumination microlens array is located on an output light path of the converging lens, the sub-image is located on an output light path of the illumination microlens array, the projection microlens array is located on an output light path of the sub-image, and the projection microlens array is configured to display an image of the sub-image;
wherein the light source comprises a plurality of point light sources, the illumination microlens array comprises a plurality of illumination microlens units, the projection microlens array comprises a plurality of projection microlens units, a number of the illumination microlens units is equal to a number of the projection microlens units, and the illumination microlens units and the projection microlens units are disposed in a one-to-one correspondence; and
each of the point light sources is located at a focal plane of the converging lens, the converging lens is configured to convert all light emitted by the point light sources into parallel light and then irradiate the parallel light to the illumination microlens array, and all light emitted by each of the illumination microlens units is irradiated on a corresponding projection microlens unit after passing through the sub-image;
wherein a diameter of the light source, a distance between the illumination microlens array and the projection microlens array, a focal length of the converging lens, and a diameter of the projection microlens unit meet a following formula:

$$\phi_s = P_R \frac{f_{CL}}{f_{PL}},$$

wherein, $\Phi_s$ is the diameter of the light source, $P_R$ is the diameter of the projection microlens unit, $f_{CL}$ is the focal length of the converging lens, and $f_{PL}$ is the distance between the illumination microlens array and the projection microlens array.

* * * * *